(12) United States Patent
Huber et al.

(10) Patent No.: US 6,273,124 B1
(45) Date of Patent: Aug. 14, 2001

(54) CHECK VALVE FLOOR DRAIN

(76) Inventors: Donald G. Huber, P.O. Box 64160, Tacoma, WA (US) 98464; Allen I. Stakset, 111107-18th Ave. East, Tacoma, WA (US) 98445

( * ) Notice: Subject to any disclaimer, the term of this patent is extended or adjusted under 35 U.S.C. 154(b) by 0 days.

(21) Appl. No.: 09/578,625

(22) Filed: May 25, 2000

Related U.S. Application Data (60) Provisional application No. 60/136,098, filed on May 26, 1999, and provisional application No. 60/141,913, filed on Jun. 30, 1999.

(51) Int. Cl.[7] .................................................. F16K 31/22
(52) U.S. Cl. .................. 137/362; 137/454.2; 137/512.4; 4/287; 4/292; 4/295
(58) Field of Search ................................ 137/362, 454.2, 137/512.4, 854, 512, 512.1; 4/287, 288, 292, 295

(56) References Cited

U.S. PATENT DOCUMENTS

| | | |
|---|---|---|
| 155,669 | 10/1874 | Painter . |
| 1,137,516 | 4/1915 | Moon . |
| 1,771,770 | 7/1930 | Bruno . |
| 1,867,478 | 7/1932 | Stelzner . |
| 2,211,212 | 8/1940 | Langdon ............................... 277/60 |
| 2,369,939 * | 2/1945 | Betts ................................. 137/512.1 |
| 2,579,855 | 12/1951 | Pockel et al. .......................... 251/119 |
| 2,655,178 | 10/1953 | Sarosdy ............................. 137/614.2 |
| 2,675,823 | 4/1954 | Langdon ............................. 137/218 |
| 2,725,075 | 11/1955 | Irgens ............................... 137/512.1 |
| 2,777,464 | 1/1957 | Mosely ............................ 137/516.13 |
| 2,912,999 * | 11/1959 | Kersh ................................. 137/512.4 |
| 2,913,000 | 11/1959 | Roberts ................................. 137/525 |
| 2,936,779 | 5/1960 | Kindred ................................. 137/525 |
| 2,997,050 | 8/1961 | Ferguson ............................... 137/63 |
| 3,059,637 | 10/1962 | Senne ................................... 128/141 |
| 3,107,687 | 10/1963 | Howe ................................... 137/362 |
| 3,228,418 | 1/1966 | Rosback et al. .................. 137/516.17 |
| 3,268,018 | 8/1966 | Neilson .................................. 175/318 |
| 3,335,741 | 8/1967 | Liljendahl ........................ 137/247.15 |
| 3,354,903 | 11/1967 | Caruso ............................. 137/512.15 |
| 3,448,766 * | 6/1969 | Schule .................................. 137/854 |
| 3,463,189 | 8/1969 | Fitzpatrick ......................... 137/614.2 |
| 3,519,012 | 7/1970 | Van Patten ........................... 137/102 |
| 3,542,057 | 11/1970 | Staiano ................................. 137/328 |
| 3,605,132 | 9/1971 | Lineback ................................. 4/211 |
| 3,730,218 | 5/1973 | Rydberg ................................ 137/525 |
| 3,911,949 | 10/1975 | Hilden et al. ......................... 137/525 |
| 3,990,439 | 11/1976 | Klinger ............................. 128/142.4 |
| 4,054,152 | 10/1977 | Ito et al. ............................... 137/512 |
| 4,098,287 * | 7/1978 | Baumbach ............................. 137/362 |
| 4,222,407 | 9/1980 | Ruschke et al. ................. 137/512.15 |
| 4,232,704 * | 11/1980 | Becker et al. ......................... 137/218 |
| 4,296,778 * | 10/1981 | Anderson ............................. 137/433 |
| 4,594,739 * | 6/1986 | Watts et al. .............................. 4/287 |

(List continued on next page.)

Primary Examiner—A. Michael Chambers
(74) Attorney, Agent, or Firm—Garrison & Associates PS; Frederick A. Kaseburg (57) ABSTRACT

An improved floor drain for buildings, basements, exterior paved areas, and the like. The invention provides floor drain assemblies and check valves providing improved drainage performance, particularly where drainage is an irregular occurrence, and having unprecedented simplicity and reliability. Floor drains according to the invention comprise check valves adapted for disposition within floor drains, the check valves generally comprising spring-loaded stops or elastic diaphragms, either of which may be tailored for opening under a selected hydrostatic pressure. Use of the check valves according to the invention permits drainage through the drain conduit while preventing back flow from the drain of undesirable or unwanted gasses. Check valves according to the invention are preferably installable in existing drain structures, and easily removable for maintenance or replacement.

21 Claims, 5 Drawing Sheets

U.S. PATENT DOCUMENTS

| | | | |
|---|---|---|---|
| 4,610,246 | 9/1986 | Delphia | 128/201.11 |
| 4,712,574 | 12/1987 | Perrott | 137/217 |
| 4,729,401 | 3/1988 | Raines | 137/512 |
| 4,762,149 | 8/1988 | Pickl, Jr. | 137/843 |
| 4,838,262 | 6/1989 | Katz | 128/205.24 |
| 5,005,603 | 4/1991 | Amundson et al. | 137/192 |
| 5,014,739 | 5/1991 | Csaszar | 137/512.15 |
| 5,277,171 | 1/1994 | Lannes | 126/362 |
| 5,419,359 | 5/1995 | Kor | 137/247.15 |
| 5,601,112 | 2/1997 | Sekiya et al. | 137/512.15 |

\* cited by examiner

CHECK VALVE FLOOR DRAIN

This application claims the benefit of United States Provisional Patent Applications Ser. No. 60/136,098, filed May 26, 1999, and entitled Check Valve Floor Drain; and Ser. No. 60/141,913, filed Jun. 30, 1999, and entitled Check Valve Floor Drain.

TECHNICAL FIELD

The invention relates to drains for building floors, basements, exterior paved areas, and the like. The invention provides floor drain assemblies and check valves providing improved drainage performance, particularly where drainage is an irregular occurrence.

BACKGROUND OF THE INVENTION

U-shaped or "gooseneck" traps have long been used in the plumbing industry to prevent backflow of harmful or annoying sewer or pipe gasses into buildings while permitting drainage of unwanted water from floors and other horizontal surfaces. Such traps operate by leaving a small quantity of fluid within the lower portion of a U-shaped trap section to act as a gas barrier. In many applications, however, particularly where access is difficult or where drainage is infrequent, it is disadvantageous to use such drains. Fluid may evaporate from the trap, permitting free flow of obnoxious gasses through the drain; insects may breed in the fluid, or in some instances the fluids may harden so as to actually block or restrict flow through the drain. Such conventional drains are also relatively difficult and expensive to install. In addition to floor drain applications, these problems are also common to other areas of fluid control, wherever fluid drainage is an occasional problem.

One solution to these problems has been the use of trap primers, which operate to ensure that a minimum level of fluid is left in the drain to act as a trap for gasses which accumulate within drains. Trap primers are usually difficult and expensive to install, and require maintenance and constant monitoring of their own to ensure their functionality.

Outside the floor drain environment, the use of check valves has been suggested. As demonstrated herein, check valves can be efficient both in facilitating draining operations and in trapping drain-pipe gasses and preventing backflow. Heretofore, however, no one has suggested placing simple, efficient check valves in floor drains, either alone or in combination or in series with other types of valves.

DISCLOSURE OF THE INVENTION

The invention provides improved floor drains of unprecedented simplicity and reliability. In one aspect, the invention provides a check valve for a floor drain, the check valve being adapted for disposition within a floor drain or a drain basin and comprising a stop adapted for sealing engagement of a drain sealing surface located proximate an inlet to said floor drain, and further comprising means adapted to urge the stop into sealing engagement with the drain sealing surface. The means for urging the stop into sealing engagement with the drain sealing surface is adapted to permit disengagement of the stop from the sealing surface as a liquid such as water enters said drain, so as to permit drainage of the fluid through the drain is permitted, while urging the stop back into contact with the sealing surface so that backflow of gasses from within said drain is prevented after the fluid has drained. Improved drain and valve assemblies provide redundant gas-trap and backflow prevention protection through the simple, economical, and efficient application of check valves. Redundant layers of check valves are installed in series to permit one-direction fluid flow and vacuum relief in drains.

In one aspect the invention provides a drain assembly for use in the drainage of drain surfaces such as building and basement floors, exterior paved areas, swimming pools, and the like. The most common application of this aspect of the invention is in the drainage of water from flooded areas, with the water flowing downward under the influence of gravity or some other driving force. Most often, this means that the fluid drains substantially vertically under gravitational influence. An assembly according to this aspect of the invention comprises a drain basin having an inlet and an outlet, with the outlet being adapted for the attachment of a drain conduit, and a plurality of check valves disposed within the drain basin. The check valves are arranged to form at least two sets, the sets being placed in series, preferably in a substantially vertical orientation, so that a chamber is formed between the sets. In a drain comprising two check valves, the valve sets are formed of one valve each. In drains comprising more than two valves, each set may be formed of any number of valves, one or more; and there may be any number of sets greater than two. The check valves are adapted, generally by a combination of their substantially vertical series orientation and by the use of valves having suitable design opening or actuating pressures, to permit drainage of fluids through the drain inlet and the chamber formed between the sets, and to prevent backflow of gasses located within the drain conduit through the chamber to the inlet. Preferably, valves are selected with opening and/or actuating pressures suitable for allowing gasses, for example air, to flow through the drain inlet and the chamber to relieve any vacuum formed within the drain conduit. The check valves are supported in a removable framework or other structure so that the valves may be removed from the drain for cleaning, repair, replacement, or other maintenance.

In another aspect the invention provides valve assemblies for use with drains for draining drain surfaces. A valve assembly according to this aspect of the invention comprises a preferably removable support structure adapted for disposition, preferably by insertion, within a drain basin installed in a floor or other drain surface. The support structure is adapted to support a plurality of check valves in the manner described, so as to form at least one chamber between individual valves or sets of valves, and to permit drainage through the drain in the manner described herein.

Check valves used with the invention are of various types. For many applications, and in particular where the drain is intended to facilitate drainage of water from floors and the like is, flapper valves having flexible diaphragms adapted to engage a circumferential seat, and optionally comprising backing plates to support the diaphragm, and spring-loaded or spring-biased valves, are preferred. The selection of suitable check valves for any given drainage application will not trouble the designer of ordinary skill in the pertinent art.

Other preferred embodiments of this check valve aspect of the invention comprise stops incorporating "flapper" diaphragms made of elastic material, such as natural or synthetic rubbers, or other polymers. The diaphragm in such embodiments has sufficient flexibility to flex under pressure or other action of liquid entering the drain in order to allow the liquid to drain, and to return to a substantially unflexed condition in which sealing engagement of the drain sealing surface by the diaphragm is restored following drainage of said liquid. In such embodiments, as may be seen, the elasticity of the diaphragm acts as the means for urging the diaphragm into sealing contact with the drain sealing surface. A particular advantage of such embodiments of the invention is that the elastic diaphragm may be relatively easily, through well known fluid static and dynamic principles, and through well known principles of structural mechanics, be adapted to flex under the action of a preselected head pressure when fluid is present within the drain. That is, the geometry, and therefore the stiffness, of a diaphragm made of any given elastic material may be selected to ensure that the valve will open when a desired amount of water is present in the drain. As will be readily understood by those of ordinary skill in the art, once the suggestion has been made, this purpose may be accomplished either by selecting an appropriate uniform thickness for the diaphragm or by tailoring the thickness to provide a non-uniform thickness having any of a wide variety of desired flexure or bending characteristics. Another way of controlling flexure in the diaphragm, as will be well understood by those of ordinary skill in the art, is to provide the elastic diaphragm with a back plate which serves to stiffen or otherwise support at least a portion of the diaphragm. In such cases portions of the diaphragm supported by the back plate will have a generally increased stiffness, as compared to non-backed portions of the diaphragm.

In other preferred embodiments of the invention the check valve is spring-biased, such that the means for urging the stop into contact with the drain sealing surfaces comprises a spring. As will be readily apparent to those having ordinary skill in the art, in such embodiments it is a relatively straightforward matter, once the idea has been suggested, to select or adapt a spring having an appropriate thickness for permitting disengagement of the stop from the sealing surface when a selected head pressure had been reached inside the drain.

An important advantage offered by drain valves according to the invention is that they may be provided either as integral parts of new drain assemblies or with separate housings to that they may be inserted in existing drain structures as retrofits. Thus new drains omitting P- or U-traps may be built, or existing drains having such traps may be provided with the advantages described herein. Likewise, stuck or damaged valves may be easily replaced. In preferred embodiments, the advantage of interchangeability or removability is easily provided by providing the check valve and the biasing means with a housing. Such a housing may be used with or without separate gaskets, etc., for sealing the drain, and may easily be adapted such that the housing itself provides the sealing surface engaged by the stop for sealing of the drain.

Another advantage offered by drain valves according to the invention is that they are readily adapted to a wide variety of drains. For example, they are easily provided in substantially circular section, for use in a standard circular or cylindrical drain pipe, or as easily provided with a rectangular or other non-standard section.

Yet another distinct advantage offered by check valves according to the invention is that they are easily installed or used in conjunction with other valves or with existing traps, so as to provide redundant valve structure and the advantages associated therewith. For example, two or more check valves according to the invention may be used together, so that if one becomes jammed or otherwise dysfunctional the other may continue to serve satisfactorily. Likewise, all of the other advantages and improvements described herein, such as the provision of the valve assembly with a housing to permit the valves to be retrofitted or removed for maintenance or replacement, are enjoyed by those embodiments incorporating additional valves.

In addition to the check valves and drain assemblies described herein, as such, it is to be understood that all new and useful devices or components described herein are considered to constitute a part of the invention, claimable in their own right, whether such is stated with particularity herein or not.

BEST MODE OF CARRYING OUT THE INVENTION

Turning now to the drawings, the invention will be described in a preferred embodiment by reference to the numerals of the drawing figures wherein like numbers indicate like parts.

Figure 1:
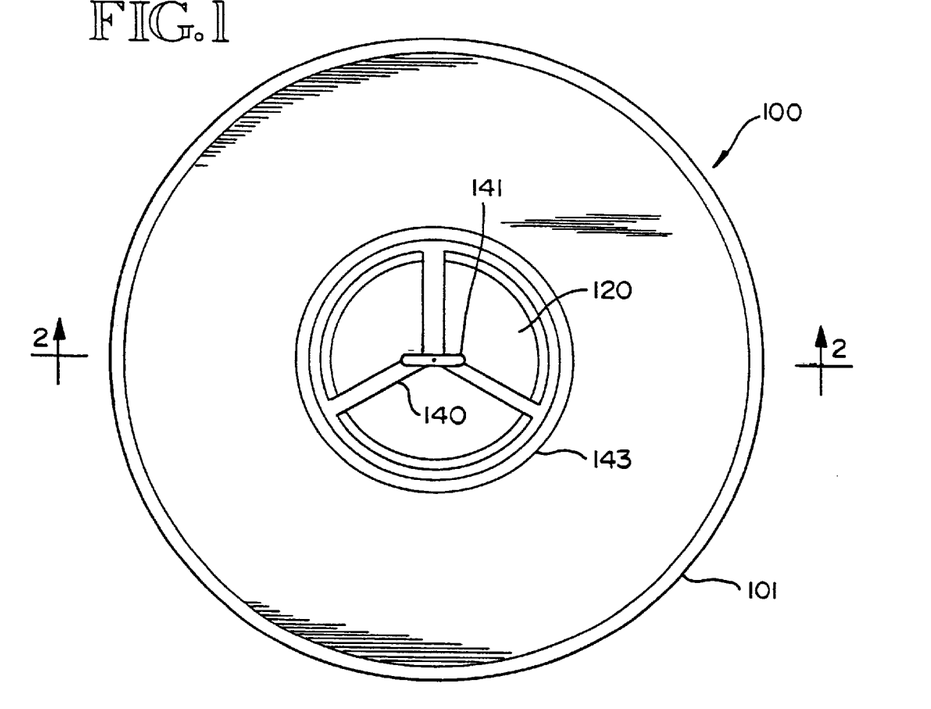
FIG. 1 is a schematic plan view of a preferred embodiment of a drain assembly according to the invention.
Figure 2:
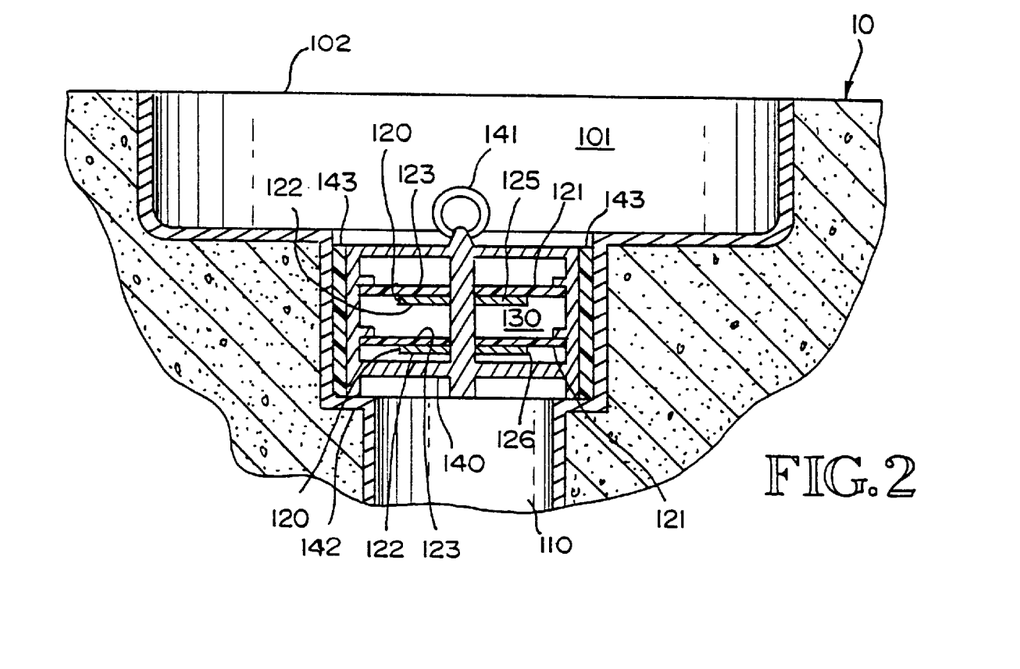
FIG. 2 is a schematic cutaway side view of a preferred embodiment of a drain assembly according to the invention, taken along section A—A in FIG. 1.

FIG. 1 shows a schematic plan view of a preferred embodiment of a drain assembly according to the invention. FIG. 2 shows a schematic side cutaway view of the same drain assembly, taken along section A—A in FIG. 1. Drain assembly 100 is installed in drain surface 10 so that water or other fluids present on and above the drain surface may drain freely through the drain assembly while gasses present beneath the drain remain trapped in place. Drain assembly 100 comprises drain basin 101, which includes inlet 102 and outlet 103; outlet 103 is attached to drain conduit 110. A check valve assembly 120 is disposed with two check valves 125 and 126 within the drain basin, with least two of the check valves being placed in series so as to form chamber 130 between valves 125 and 126. By virtue of their substantially vertical orientation and their design opening or actuating pressures, check valve assembly 120 is adapted to permit drainage of a fluid from said drain inlet and from said chamber, and to prevent backflow of fluids and/or gasses located within said drain conduit and said chamber to said inlet (as shown by arrows 150 in FIG. 3). Thus the drain assembly acts as both a drain valve and a trap, without the difficulties and expense of installing prior art p-shaped drain traps.

In preferred embodiments of the invention the substantially vertical orientation of the drain assembly and the selection and use of valves having appropriate actuation or opening pressures, prevents substantial amounts of fluid from building up within chamber the chamber 130 as fluid drains through the assembly.

Preferably, valves are chosen such that their actuation or opening pressures permit air or other fluids to bleed through the drain assembly in order to relieve any vacuum which may build up in the drain conduit.

The use of more than one check valve, with the valves disposed in series and adapted to operate independently of each other, helps to ensure proper functioning of the drain, particularly in case foreign matter intercedes between the check valve itself and any surrounding structure in such manner as to prevent the valve from closing properly or completely. This is particularly useful in ensuring that unwanted gasses remain trapped within the drain conduit, and are not permitted to escape into the atmosphere above the drain; and in preventing back flow through the drain due to floods, etc. This structure also precludes access by insects to fluids in the drain.

A particularly useful optional feature of preferred embodiments of the drain assembly according to the invention is the placement or mounting of the check valves in a removable structure, to facilitate cleaning, repair, replacement, or other maintenance of the valves. For example, in the embodiment shown in FIGS. 1 and 2 check valve assembly 120 is mounted in frame 140, which rests upon shoulder 142 in the drain basin. Proper functioning of the drain is aided, in the embodiment shown, by the use of optional sealing ring 143, which is in place between the frame 140 and drain basin 101. Frame 140 is removable from the drain assembly by means of ring 141, or any other structure or mechanism suitable for the purpose.

As indicated above, check valves used with the invention may be of any suitable type. In the embodiment shown in FIGS. 1 and 2 flapper valves 121 are used. Flapper valves 121 comprise flexible valve portions 123 and optional substantially rigid back plates 122. The construction and operation of flapper valves, with or without back plates, is well understood by those having ordinary skill in the art, and will not trouble the designer of systems of the type described herein.

Figure 3:
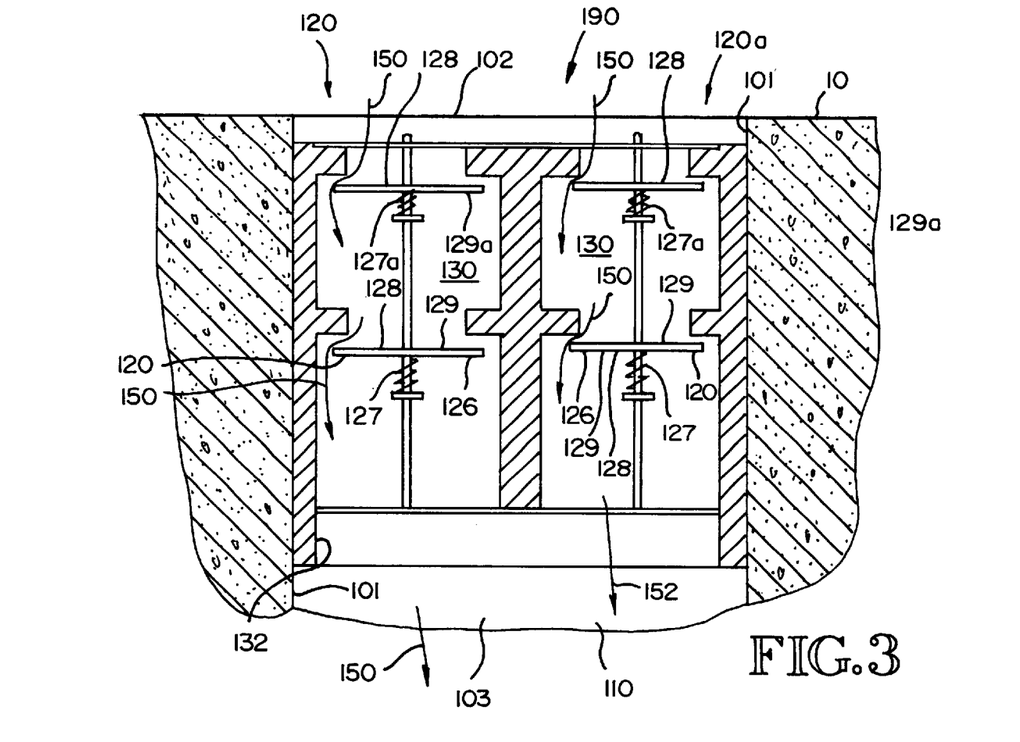
FIG. 3 is a schematic cutaway side view of another preferred embodiment of a valve assembly according to the invention.

FIG. 3 is a schematic cutaway side view of a preferred embodiment of a valve assembly 190 according to the invention. In the embodiment shown, first check valve assembly 120 and second check valve assembly 120a each comprise two spring-biased valves 128 and 128a comprising a valve plate 129 and 129a and a spring 127 and 127a. As will be readily appreciated by the artisan of ordinary skill, valves 128 and 128a open under the action of a relatively higher pressure above the drain and a relatively lower pressure beneath the drain. It is to be noted that valve assembly 190 is inserted directly into drain basin 101, which may consist of, for example, an open end of a drain conduit 103. It should also be noted that chamber 130 may comprise either a single annular (or arbitrarily shaped) chamber or a set of multiple chambers between different groups of check valves.

Figure 4:
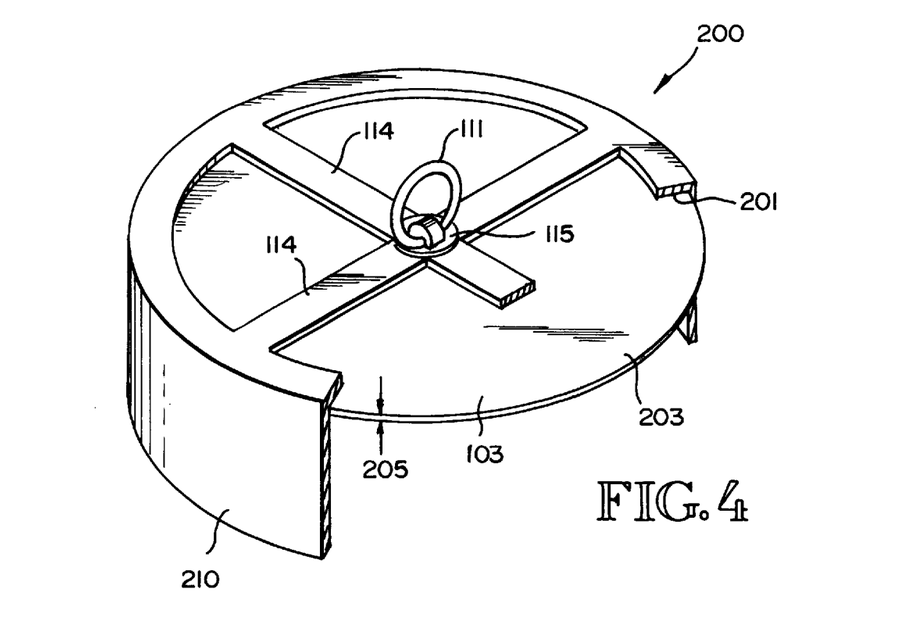
FIG. 4 is a schematic perspective view of another preferred embodiment of a check valve according to the invention.
Figure 5:
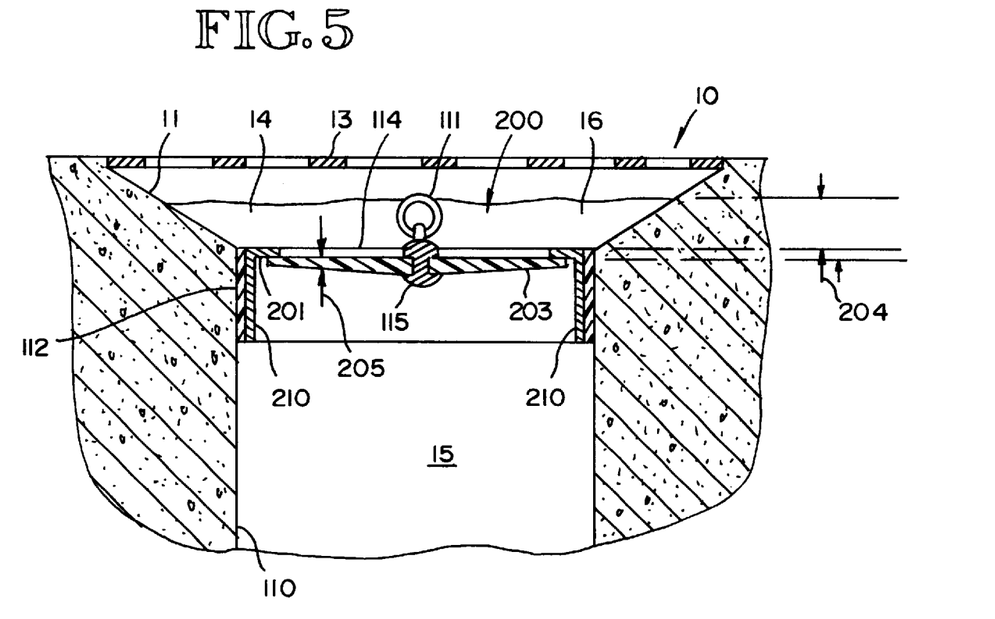
FIG. 5 is a schematic cross-sectional view of the apparatus of FIG. 4.
Figure 6:
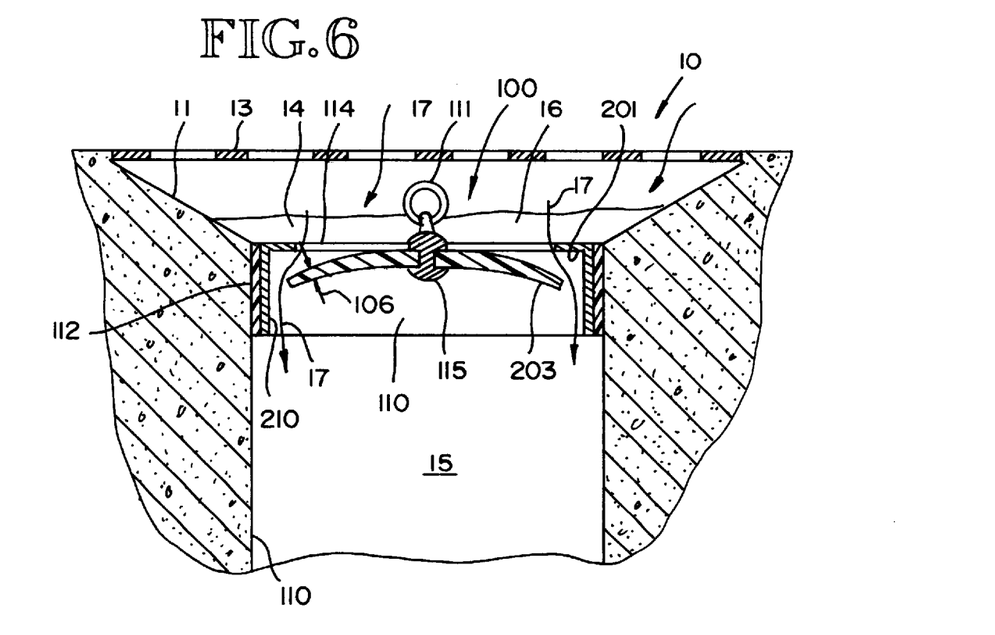
FIG. 6 is a schematic cross-sectional view of the apparatus of FIG. 4 with the diaphragm opened by presence of a fluid.

FIG. 4 is a schematic perspective view of another preferred embodiment of a check valve according to the invention. FIGS. 5 and 6 are schematic cross-sectional views of the device of FIG. 4. Check valve 100 is in place in floor drain 10. Check valve 200 comprises diaphragm 203 adapted for sealing engagement of drain sealing surface 201, which when check valve 100 is installed in a floor drain is located proximate inlet 14 of drain 10, such that when diaphragm 203 is sealingly engaged with sealing surface 201, a fluid tight seal is produced between the drain basin 11 or the exterior of the drain and drain conduit 110 attached to the drain. Thus, gasses trapped within the interior of the drain or within drain conduit 110 are prevented from escaping from the drain.

Most typically, sealing surface 201 is formed by a circumferential rim or other surface disposed about an outlet to the drain conduit, or by a part of a removable housing such as optional housing 210 for check valve 100, which is provided for ease installation or removal. In the embodiment shown in FIGS. 1–3, sealing surface 101 is a part of housing 110, which together with optional gasket 112 serves to form a seal between diaphragm 203 and the wall of drain 110.

In the embodiment shown in FIGS. 1–3, flexible diaphragm 203 is formed to engage sealing surface 201. As shown in FIGS. 1 and 3, diaphragm 203 has sufficient flexibility to flex under action of a liquid (represented by arrows 17) as it enters drain basin 11, and thus to allow drainage of the liquid, and to return substantially to its original, unflexed condition, so that sealing between the diaphragm and the drain sealing surface is restored as the fluid drains. In preferred embodiments of this aspect of the invention diaphragm 203 is adapted to flex under the action of a preselected head pressure within said drain. This may be accomplished in any number of ways, most of which will occur to those of ordinary skill in the art once they have been exposed to the material herein. For example, diaphragm 203 may be made of a suitable uniform thickness such as thickness 205 shown in FIG. 1, or from a variable thickness tailored for any desired change in flow rate with respect to pressure, such as thickness 206 in FIGS. 2 and 3. The structural properties of diaphragms being relatively well known, and hydrostatic pressure being given by the equation $sp = \rho g h$, where $\rho$=pressure, $\rho$=the specific gravity of the liquid to be drained through the valve, g=the local acceleration due to gravity or other body force acting on the liquid, and h=head, as shown by reference 204 in FIG. 5. Thus, is it a straightforward matter for one having ordinary skill in the art, once armed with this disclosure, to select an appropriate head 204 and to design a diaphragm 203 which will deflect suitably in the presence of that head and permit the fluid to drain into the conduit 110.

Figure 9:
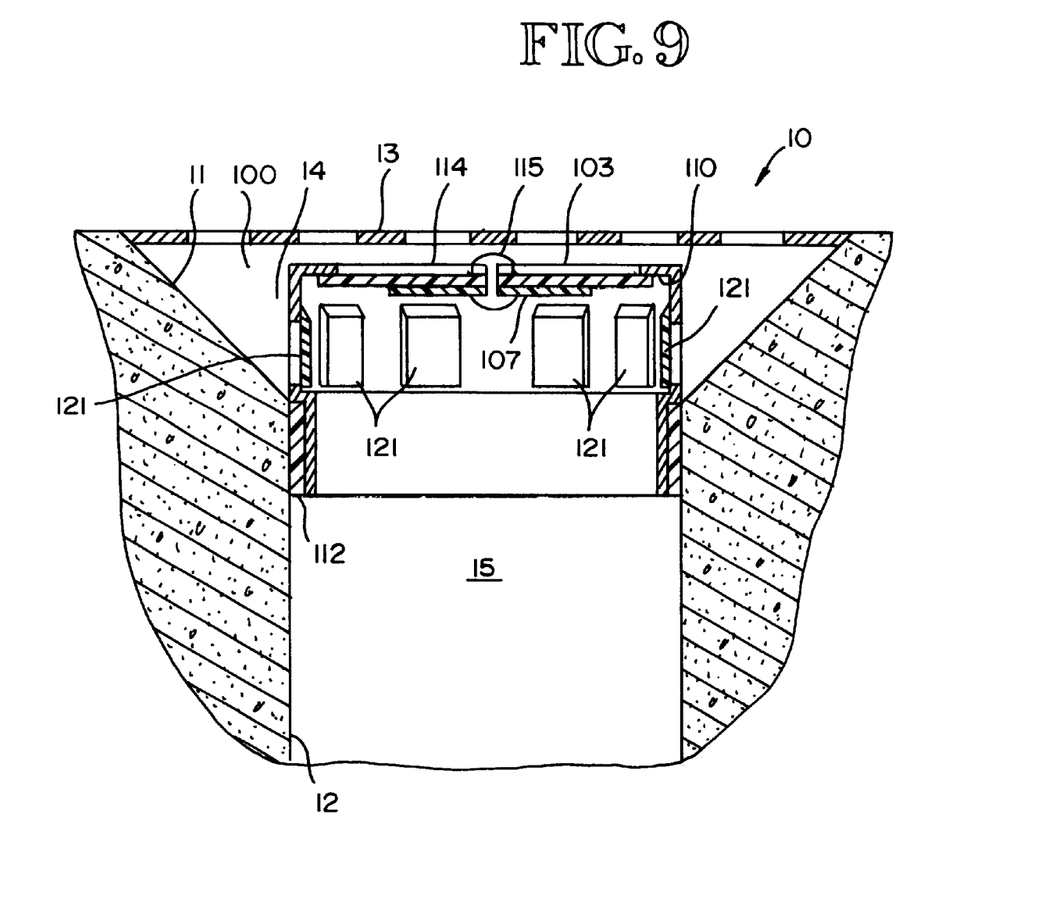
FIG. 9 is a schematic cross-sectional view of yet another alternative preferred embodiment of a check valve floor drain according to the invention.

An optional alternative means for tailoring the deflection of diaphragm 203 under any given head of water or for otherwise increasing or affecting the stiffness of the plate is through the use of a back plate on one side of the diaphragm. Most commonly such a plate will be placed on the drain side of the diaphragm, as shown in FIG. 9, but the effect of water accumulating in the drain basin on the diaphragm may be affected as well by placing the back plate before the diaphragm. Typically a back plate such as plate 107 in FIG. 9 will support at least a portion of the diaphragm, and depending upon the stiffness of the diaphragm and the plate may support the entire diaphragm.

Figure 7:
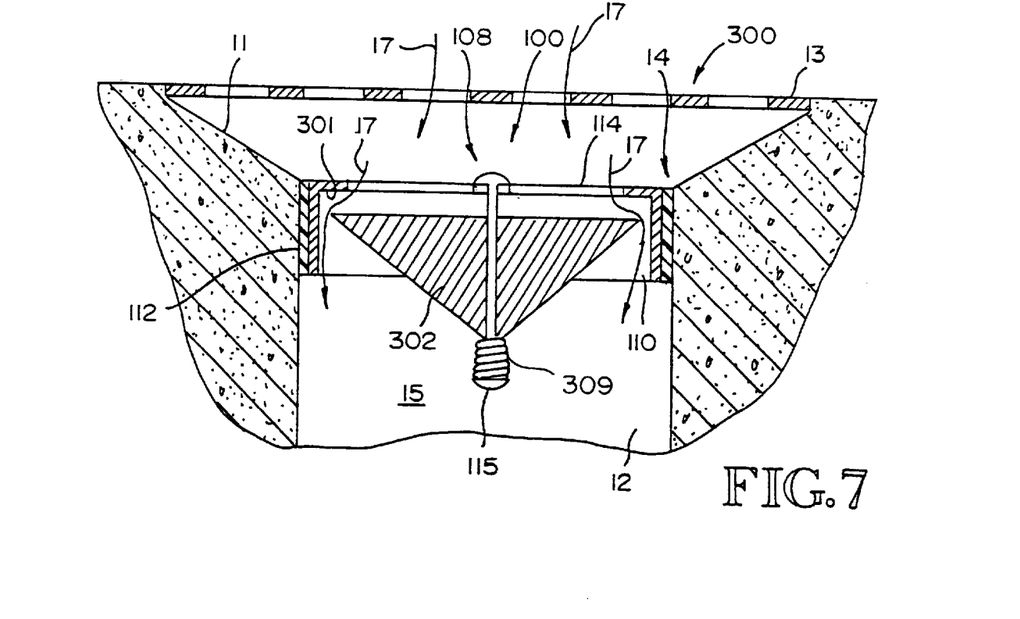
FIG. 7 is a schematic cross-sectional view of an alternative preferred embodiment of a check valve floor drain according to the invention.

In alternative preferred embodiments of this aspect of the invention the check valve comprises a spring or extendable mounting cord adapted to urge the stop into sealing engagement with the drain sealing surface. Such an embodiment is shown in FIG. 7. Check valve 300 comprises stop 302 and spring 309, which serves to bias stop 302 into sealing contact with sealing surface 301. As shown in FIG. 7, spring 309 is compressed under action of fluid in the drain, the motion of which is represented by arrows 17, so as to allow stop 302 to disengage from sealing surface 301, and therefore to allow the fluid to drain. As will appear to those of ordinary skill in the art, it is a relatively simple matter to select a spring 309 having an appropriate stiffness to allow stop 302 to disengage the sealing surface when a desired level of liquid has accumulated in the drain. In general, it has been observed that under some circumstances the selection and fabrication of a spring having just the desired stiffness may be more difficult than making a flexible diaphragm of the type described herein having an appropriate flexibility and elasticity.

One advantage of providing check valves according to the invention with on optional housing such as housing 110 or 210 in the Figures is that the housing may be provided with convenient means for installing and removing the check valve in a floor drain. For example, ring 111 in FIGS. 4–6 permits removal of the check valve. In addition to providing an attachment for the installation and removal means housing 110 or 120 provides structural support for stop 302 or diaphragm and the biasing means, and optionally a drain sealing surface 201. In embodiments of the invention comprising flexible diaphragms 203, the housing may include cross members 114 or other structure to provide direct attachment for the diaphragm, as by means of fastener 115, which may consist of a rivet, nut and bolt, or other mechanical fastener. Alternatively, the diaphragm may be attached with adhesive or with a bonding process, or integrally molded. Similarly, diaphragm 203 and spring 309 may be supported by means of cross members 114 and fasteners 115 or by any other suitable method.

Figure 8:
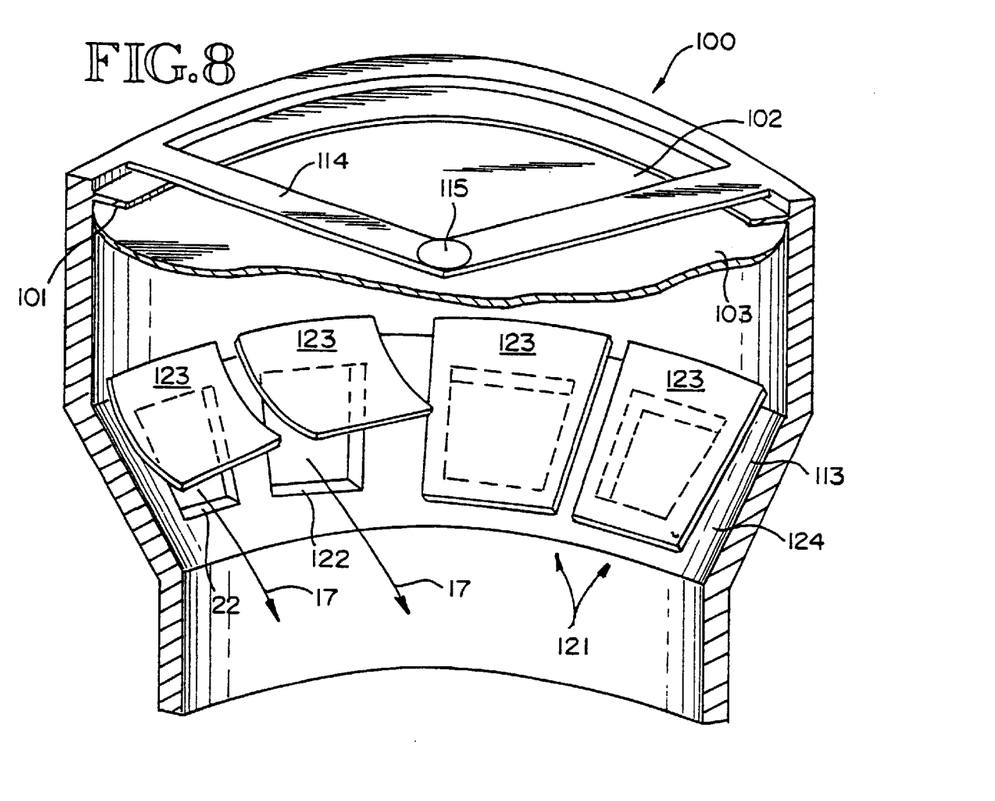
FIG. 8 is a schematic perspective partial section view of another alternative preferred embodiment of a check valve floor drain according to the invention.

It may be seen that check valves according to the invention may be of arbitrary cross section or plan view. That is, they are readily adaptable to use with drains of circular cross section, as in the case of an ordinary drain pipe, or with rectangular conduit or conduit of any other shape. Embodiments of the invention adapted for use with pipes or conduits of substantially circular cross section are shown in FIGS. 4 and 8.

A further advantage of the use of check valves according to the invention is that they may be used singularly, as preferred, or in combination with other valves in any number. For example, two check valves according to the invention may be used in series, or in parallel. One particularly useful combination is shown in FIGS. 8 and 9, wherein a check valve according to the invention is housed in series with a series of side-port flapper valves 121. Side port flapper valves 121 are set in the side of housing 110 and comprise ports 122 and valve covers 123. A valve cover 123 is hinged along one edge of each of ports 122 and adapted to open under influence of liquid present in drain basin 11, as shown in FIG. 5. In preferred embodiments, valve covers 123 are fabricated from flexible elastic material such as sheet rubber (which may be either natural or synthetic, and composed of any suitable material) and are fastened or adhered along the top edge of their associated ports. As in the case of flexible diaphragms 203, valve covers 123 may be tailored by means of thickness (uniform or nonuniform) or material to open under any design hydrostatic pressure. It is advantageous, but not necessary, in making side port flapper valves to provide housing 110 with sloping sides 124, so that valve covers 123 are assisted by gravity or other body force in closing, so as to help prevent back flow of gasses from the interior of the drain conduit.

Check valves and associated components ofthe invention are advantageously made from any suitable materials. For example, diaphragms and stops may be fabricated from natural or synthetic rubbers, or other suitable pliant and resilient materials, including a great many polymers, while stops and housings may be made of plastics such as PVC or APP, metals, or any of a wide variety of other materials.

With regard to systems and components above referred to, but not otherwise specified or described in detail herein, the workings and specifications of such systems and components and the manner in which they may be made or assembled or used, both cooperatively with each other and with the other elements ofthe invention described herein to effect the purposes herein disclosed, are all believed to be well within the knowledge of those skilled in the art. No concerted attempt to repeat here what is generally known to the artisan has therefore been made.

INDUSTRIAL APPLICABILITY

The invention has applicability in the field of plumbing and fluid control or removal. In particular, the invention represents improvements in drain systems for floors and other surfaces in which infrequent drainage must be reliably and efficiently processed.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

What is claimed is:

1. A valve assembly for use in substantially vertically draining drain surfaces, the valve assembly comprising:

a support structure adapted for disposition within a drain basin, said support structure adapted to support a plurality of check valves; and at least two of said check valves removably or interchangeably disposed within said support structure and placed in series so as to form between a first valve and a second valve a chamber, said check valves adapted to permit drainage of a liquid from said drain inlet and from said chamber, and to prevent backflow of gasses located within said drain conduit and said chamber to said inlet, whereby a redundant seal is achieved to prevent backflow of gases in the event one of the serial valves fails to close.

2. The assembly of claim 1, wherein at least one of said check valves comprises a flapper valve.

3. The assembly of claim 1, wherein at least one of said check valves comprises a spring-biased valve.

4. A drain assembly for use in substantially vertical drainage of drain surfaces, the assembly comprising:

a drain basin having an inlet and an outlet, said outlet adapted for attachment of a drain conduit; and a plurality of check valves disposed within said drain basin, said plurality of check valves comprising at least one check valve placed in series with a second check valve so as to form a chamber between said first valve and said second valve, said check valves adapted to permit drainage of a liquid from said drain inlet and from said chamber, and to prevent backflow of gasses located within said drain conduit and said chamber to said inlet, whereby a redundant seal is achieved to prevent backflow of gases in the event one of the serial valves fails to close.

5. The assembly of claim 4, wherein said check valves are supported in a removable structure.

6. The assembly of claim 4, comprising at least two pairs of parallel said first and second check valves in series.

7. The assembly of claim 4, wherein at least one of said check valves comprise a flapper valve.

8. The assembly of claim 4, wherein at least one of said check valves comprise a spring-biased valve.

9. The assembly of claim 4, further comprising a second set of at least two check valves in parallel with said first set.

10. A check valve for a floor drain, the check valve adapted for disposition within a floor drain and comprising:
   a drain sealing surface located proximate to an inlet to said floor drain;
   a stop adapted for sealing engagement of said drain sealing surface, said stop further adapted to provide substantial flow of liquid in the open position around the periphery of said stop; and
   a means adapted to urge said stop into sealing engagement with said drain sealing surface, said means adapted to permit disengagement of the stop from the sealing surface as said liquid enters said drain, whereby free flowing drainage of the liquid through said drain is permitted, and backflow of gasses from within said drain is prevented.

11. The check valve of claim 10, wherein said stop is an elastic diaphragm having sufficient flexibility to flex into a open position under action of said liquid and to allow drainage of said liquid, and to return to a substantially unflexed condition in which sealing engagement of said drain sealing surface by said diaphragm is restored following drainage of said liquid.

12. The check valve of claim 11, further comprising a back plate adapted to support at least a portion of said diaphragm.

13. The check valve of claim 11, wherein said elastic diaphragm is adapted to flex under the action of a preselected liquid head pressure within said drain.

14. The check valve of claim 13, wherein said diaphragm comprises a substantially uniform thickness.

15. The check valve of claim 11, wherein said diaphragm comprises a substantially uniform thickness.

16. The check valve of claim 10, wherein said check valve is a spring-biased valve and said means adapted to urge said stop into sealing engagement comprises a spring adapted to urge said stop into sealing engagement with said drain sealing surface.

17. The check valve of claim 16, wherein said spring has a stiffness adapted to permit disengagement of said stop from said sealing surface when a selected liquid head pressure had been reached inside said drain.

18. The check valve of claim 10, said valve comprising a housing to support said stop and said means for urging said stop into sealing contact with said drain sealing surface, said housing adapted for removable or interchangeable disposition of said check valve within said drain.

19. The check valve of claim 10, wherein said valve is adapted for sealing engagement of a substantially circular drain.

20. The check valve of claim 10, wherein said valve is adapted for sealing engagement of a rectangular drain.

21. The check valve of claim 10, connected in series with any other valve.

* * * * *